United States Patent [19]
Messmer

[11] 3,877,292
[45] Apr. 15, 1975

[54] AIR GAGE CARTRIDGE

[75] Inventor: Robert C. Messmer, King of Prussia, Pa.

[73] Assignee: J. M. Schmidt Precision Tool Co., Inc., West Chester, Pa.

[22] Filed: Oct. 15, 1973

[21] Appl. No.: 406,151

[52] U.S. Cl. .............................. 73/37.5; 33/DIG. 2
[51] Int. Cl. .......................................... G01b 13/00
[58] Field of Search .................. 73/37.5, 37.6, 37.8; 33/DIG. 2

[56] References Cited
UNITED STATES PATENTS

| | | | |
|---|---|---|---|
| 2,357,569 | 9/1944 | Wright et al. | 73/37.5 UX |
| 2,737,727 | 3/1956 | Aller | 33/DIG. 2 |
| 2,807,880 | 10/1957 | Darmody | 33/DIG. 2 |

FOREIGN PATENTS OR APPLICATIONS

| | | | |
|---|---|---|---|
| 760,816 | 11/1956 | United Kingdom | 33/DIG. 2 |

Primary Examiner—Richard C. Queisser
Assistant Examiner—Joseph W. Roskos
Attorney, Agent, or Firm—Smith, Harding, Earley & Follmer

[57] ABSTRACT

A ball contact air gage cartridge in which the gaging ball is held in position adjacent the restrictive gaging orifice by means of a plurality of spring fingers whereby the ball can be removed and reinserted for servicing purposes such as repair or replacement without damaging the cartridge in any way.

8 Claims, 5 Drawing Figures

AIR GAGE CARTRIDGE

BACKGROUND OF THE INVENTION

This invention relates generally to air gage cartridges and more particularly to the ball contact type of air gage cartridges.

The cartridges of the indicated type are used with conventional air gages which typically comprise a regulated compressed air supply, some form of flow or pressure measuring instrument, and an air gage cartridge or head which includes a restricted gaging nozzle. The elements of the system are arranged so that the regulated flow of air is delivered past the measuring instrument to the gaging nozzle. In measuring the dimensions of a workpiece the nozzle is positioned adjacent the workpiece which restricts the flow of air from the nozzle. This flow of air out of the gaging nozzle is dependent upon the clearance between the workpiece and the gaging nozzle. Variations of this clearance causes a corresponding variation in the flow through the nozzle and the back pressure in the system which are measured by means of a suitable flow meter or pressure gage.

Ball contact air gage cartridges are used in many applications in which measurements cannot be made accurately by an open nozzle cartridge. Typical of such applications are the gaging of workpieces having rough surfaces, the gaging of porous surfaces, and the gaging of short lands or sharp corners. The ball contact air gage cartridges in use today comprise a gaging ball between the nozzle opening and the end of the cartridge for contacting the workpiece, which arrangement overcomes the inaccuracies that would result with an open nozzle in the gaging applications discussed above. The restricted nozzle is inside of the cartridge adjacent the inner portion of the ball with the outer portion of the ball being adapted to contact the workpiece. The ball is normally retained on the cartridge by a cap or by deforming the end of the cartridge, as by staking or swaging. This construction produces a permanent or sealed type of cartridge which has the serious disadvantage that it cannot be broken down in the field for various desirable purposes such as cleaning, repair or replacement of the ball, repair of a damaged nozzle seat, or resizing of a nozzle diameter to produce a matched pair of cartridges.

SUMMARY OF THE INVENTION

It is the general object of the invention to provide a ball contact air gage cartridge which is constructed so that the gaging ball is retained in the cartridge in a manner such that it can be removed therefrom and reinserted back into the cartridge without damaging the cartridge structure in any way. The cartridge in accordance with the invention permits ready removal of the ball in the field for servicing the cartridge. Thus, the ball can be removed for cleaning purposes whereby the use of the cartridge is not limited to clean applications. Also, the ball can be removed from the cartridge for replacement thereof in the event that it becomes damaged or for repair of a damaged nozzle seat. Furthermore, the ball can be removed for resizing the nozzle diameter to produce a matched pair of cartridges as is often desirable in certain applications. Moreover, the above-discussed servicing can be performed without causing any damage to the cartridge requiring expensive and complicated repair which cannot be performed in the field.

Briefly stated, the general object of the invention is achieved by the provision of an air gage cartridge which comprises a body portion defining a nozzle opening at one end thereof, an air supply passage formed in the body portion for the delivery of a supply of air to the nozzle opening, a gaging ball, and means for mounting the gaging ball for free movement on the body portion at a location adjacent the nozzle opening so that air flow through the nozzle opening urges said ball away from the nozzle opening for contact with a workpiece. The mounting means is constructed to limit the movement of the ball away from the nozzle opening and for guiding the ball for movement toward and away from the nozzle opening within a limited range of movement and is provided with flexible portions adapted to be flexed from their normal condition to permit movement of the ball from said cartridge and to permit the reinserting of said ball into said cartridge without any damage being caused to the cartridge.

DESCRIPTION OF THE PREFERRED EMBODIMENT

Figure 1:
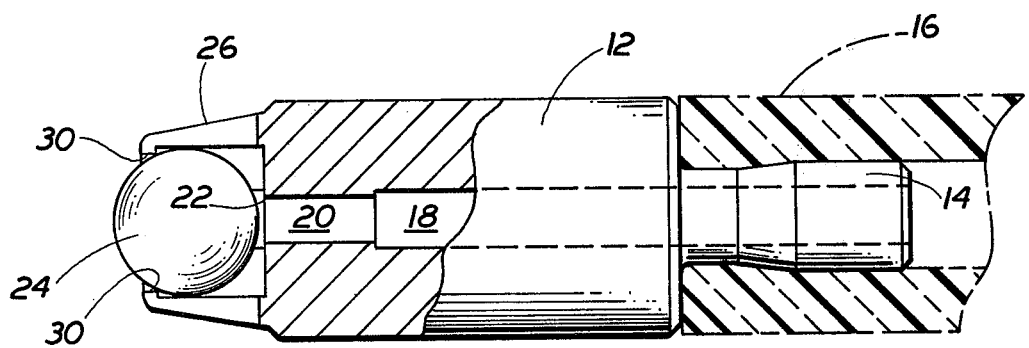
FIG. 1 is an enlarged side elevation, partly in section, of an air gage cartridge in accordance with the invention.

The air gage cartridge in accordance with the invention is indicated generally at 10 and comprises a cylindrical body portion 12 having a barb portion 14 projecting from one end. The barb portion 14 is adapted to have connected thereon a hose 16 through which compressed air is supplied to an internal passageway 18 with the cartridge 10. Passageway 18 communicates with a restricted nozzle passage 20 which defines a nozzle opening 22 at an end of the body portion 12.

A gaging ball 24 is mounted on the end of the body portion 12 adjacent the nozzle opening 22. The mounting is such that the gaging ball 24 serves as a valve member cooperating with the nozzle opening 22 which serves as a valve seat to meter the flow through the nozzle passage 20.

Figure 2:
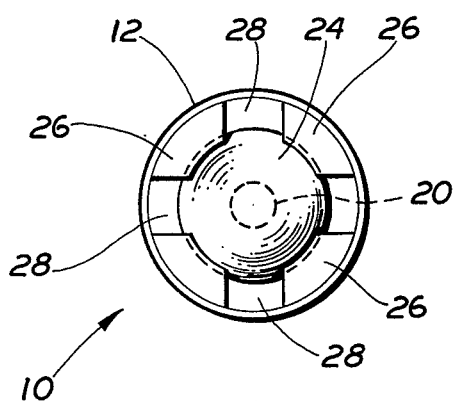
FIG. 2 is an end view of the cartridge shown in FIG. 1.

In accordance with the invention, there is provided novel means for mounting the gaging ball 24 on the body portion 12. Such means comprises four arcuate spring fingers 26 projecting axially from the nozzle end of the body portion 12. The spring fingers 26 are circumferentially spaced around the gaging ball 24 as is best shown in FIG. 2 and define four slotted air escape passageways 28 therebetween. At their outer ends the spring fingers 26 are provided with radially inwardly projecting lips 30 defining arcuate seats for limiting the outward movement of the gaging ball 24. The parts are constructed and arranged so that ball 24 is retained on the end of the body portion 12 by means of the spring fingers 26 for movement toward and away from said nozzle openings 22 within a limited range of movement.

Figure 3:
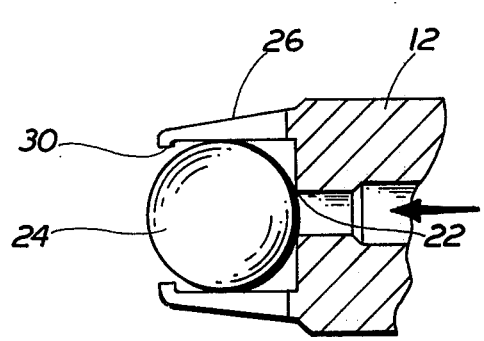
FIG. 3 is a fragmentary view illustrating the zero flow condition of the cartridge shown in FIG. 1.
Figure 4:
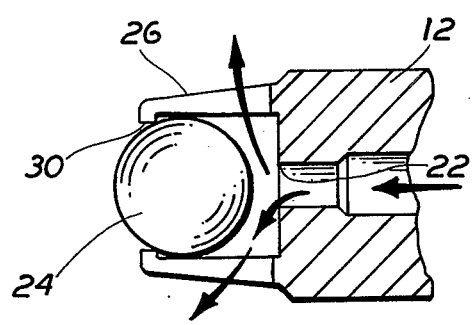
FIG. 4 is a fragmentary view illustrating the maximum flow condition of the cartridge shown in FIG. 1.

As shown in FIGS. 3 and 4 the spring fingers 26 and the gaging ball 24 are designed so that the gaging ball 24 can move freely within the support provided by the spring fingers 26 between the zero flow position of FIG. 3 in which the ball 24 is seated on the nozzle opening 22 and the maximum flow position of FIG. 4 in which the gaging ball 24 is in contact with the seats formed on the lips 30 of the spring fingers 26. During an actual gaging operation, the gaging ball 24 would normally be positioned between these two limit positions since it would be in contact with the workpiece. Of course, the distance between the gaging ball 24 and the nozzle opening 22 is an indication of the dimension of the workpiece and this clearance is measured by the measuring gage provided in the system as was discussed above.

The flexibility of spring fingers 26 is designed so that they will retain the gaging ball 24 on the end of the body portion 12 during normal operating conditions. The flow of air through the nozzle opening 22 causes it to impinge against the gaging ball 24 and urge it in the direction toward the seat provided by the lips 30 on the spring fingers 26. If the gaging ball 24 is not contacted by the workpiece, it will be retained in this position in contact with the lips 30. However, if it should be desired to remove the gaging ball 24 from the cartridge 10 for servicing purposes or the like, the spring fingers 26 are designed to be flexible enough to permit the removal of the gaging ball 24 from the retained position by a manually applied force. Also, the flexibility must be such that the spring fingers 26 will not be stressed beyond their elastic limit during the removal operation.

Figure 5:
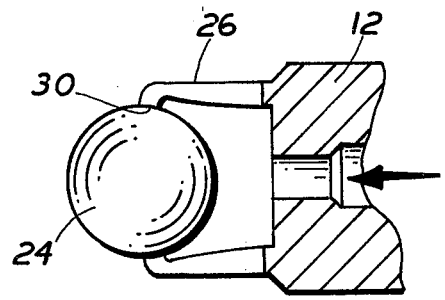
FIG. 5 is a fragmentary view illustrating in exaggerated form the condition of the cartridge parts during removal of the gaging ball.

The movement of the parts during a ball removal operation is illustrated in FIG. 5 which shows in exaggerated form the maximum flexure of the spring fingers 26 from normal position as the gaging ball 24 is removed from the cartridge 12. After the ball is completely removed, the spring fingers 26 will return to the normal position. A typical flexure movement of the spring fingers 26 would be about four thousandths at the lip end thereof.

The removal of the ball is achieved by either inserting a pry bar through one of the slots 28 between the spring fingers 26 or by inserting a rod from the other end of the body portion through the passageway 18 and nozzle passageway 20 to apply a force against the ball to urge it in the direction away from the nozzle opening 22. The spring fingers 26 are designed so that this can be achieved without causing any distruction of the components of the cartridge 10.

The gaging ball 24 is reinserted into the position within the spring fingers 26 by simply pushing it inwardly past the seat provided by lips 30 toward the nozzle opening 22. The inward movement of the gaging ball 24 causes the spring fingers 26 to separate by a camming-like action to permit the gaging ball 24 to move past the seat provided by the lips 30 of the spring fingers 26 into the position adjacent the nozzle opening 22. The flexure of the spring fingers 26 is essentially the same as that occurred when the ball is removed from the cartridge although the direction of movement of the ball is opposite.

Since the cartridge 10 is relatively small (typically about ⅜ of an inch in diameter), the manufacture of the spring fingers requires considerable precision and the use of a material with sufficient hardness. The use of stainless steel with a hardness of 56–58 on the Rockwell C Scale has been found to be satisfactory.

It will be apparent that various changes may be made in the construction and arrangement of parts without departing from the scope of the invention.

I claim:

1. An air gage cartridge comprising a body portion defining a nozzle opening at one end thereof, an air supply passage formed in said body portion for delivering a supply of air to said nozzle opening, a gaging ball, and means for mounting said gaging ball for free movement on said body portion adjacent the nozzle opening so that air flowing through said nozzle opening urges said ball away from the nozzle opening for contact with a workpiece, said mounting means including portions limiting the movement of said ball away from said nozzle opening and flexible portions cooperating with said limiting portions for supporting said ball for movement toward and away from said nozzle opening within a limited range of movement, said flexible portions being adapted to be flexed from their normal position to permit the removal of said ball from said cartridge in response to the movement of said ball in the direction away from said nozzle opening past said limiting portions, said flexible portions comprising a plurality of spring fingers extending from said one end of said body portion so as to be freely exposed from the outside of the cartridge for freedom of flexure during ball removal, said spring fingers being circumferentially spaced around said gaging ball for guiding the same for movement toward and away from said nozzle opening.

2. An air gage cartridge according to claim 1 wherein each of said spring fingers is provided with a radially inwardly extending lip, said lips defining seats providing said portions limiting the movement of said ball away from said nozzle opening.

3. An air gage cartridge according to claim 2 wherein said spring fingers have an arcuate configuration extending around said gaging ball, said lips having an arcuate configuration conforming to the surface of said ball.

4. An air gage cartridge according to claim 1 wherein said circumferentially spaced spring fingers define slots therebetween to provide for the passage of air from said nozzle opening to atmosphere, said slots extending from the free end of said spring fingers to said one end of said body portion to provide free access for inserting a ball removing tool through said slots to a location behind said ball.

5. An air gage cartridge according to claim 1 wherein each of said spring fingers is constructed and arranged and has sufficient flexibility so that said gaging ball can be forced manually from the outside of said cartridge into said mounted condition by moving it past the ends of said spring fingers towards said nozzle opening without damaging said spring fingers whereby said gaging ball can be removed from said mounting means and returned thereto without destruction of said spring fingers.

6. An air gage cartridge according to claim 5 wherein each of said spring fingers is provided with a radially inwardly extending lip, said lips defining seats providing said portions limiting the movement of said ball away from said nozzle opening.

7. An air gage cartridge according to claim 6 wherein said spring fingers have an arcuate configuration extending around said gaging ball, said lips having an arcuate configuration conforming to the surface of said ball.

8. An air gage cartridge according to claim 7 wherein said circumferentially spaced spring fingers define slots therebetween to provide for the passage of air from said nozzle opening to atmosphere.

* * * * *